United States Patent
Gupta

(10) Patent No.: US 11,923,763 B1
(45) Date of Patent: Mar. 5, 2024

(54) RIPPLE CANCELLATION APPARATUS AND CONTROL METHOD

(71) Applicant: Halo Microelectronics International, Campbell, CA (US)

(72) Inventor: Milind Chandra Gupta, San Jose, CA (US)

(73) Assignee: Halo Microelectronics International, Campbell, CA (US)

( * ) Notice: Subject to any disclaimer, the term of this patent is extended or adjusted under 35 U.S.C. 154(b) by 1 day.

(21) Appl. No.: 17/821,685

(22) Filed: Aug. 23, 2022

(51) Int. Cl.
*H02M 1/42* (2007.01)
*H02M 1/14* (2006.01)
*H02M 3/335* (2006.01)

(52) U.S. Cl.
CPC .......... *H02M 1/14* (2013.01); *H02M 1/4208* (2013.01); *H02M 3/33576* (2013.01)

(58) Field of Classification Search
CPC ........ H02M 1/14; H02M 1/42; H02M 1/4208; H02M 3/335; H02M 3/33576
See application file for complete search history.

(56) References Cited

U.S. PATENT DOCUMENTS

| | | | |
|---|---|---|---|
| 4,224,659 A | 9/1980 | Iguchi | |
| 2009/0185398 A1* | 7/2009 | Cuk | H02M 3/33507 363/21.1 |
| 2014/0085944 A1 | 3/2014 | Lee et al. | |
| 2014/0252973 A1* | 9/2014 | Liu | H02J 1/02 315/200 R |
| 2022/0319759 A1* | 10/2022 | Jin | H01F 27/26 |

FOREIGN PATENT DOCUMENTS

| | | |
|---|---|---|
| CN | 109004838 A | 12/2018 |
| CN | 112217389 A | 1/2021 |
| CN | 216599446 U | 5/2022 |
| JP | H0775335 A | 3/1995 |

* cited by examiner

*Primary Examiner* — Gary L Laxton
(74) *Attorney, Agent, or Firm* — AP3 Law Firm PLLC

(57) ABSTRACT

An apparatus includes a first winding and a first switch connected in series between an input terminal and ground, a second winding magnetically coupled to the first winding and coupled to an output terminal through a second switch, a third winding magnetically coupled to the first winding and connected in series with a fourth switch, a fourth winding magnetically coupled to the first winding and connected in series with a third switch, and an energy storage device connected between a common node of the third winding and the fourth winding, and ground.

20 Claims, 10 Drawing Sheets

RIPPLE CANCELLATION APPARATUS AND CONTROL METHOD

TECHNICAL FIELD

The present invention relates to a power factor correction flyback converter, and, in particular embodiments, to an apparatus and control method for reducing output ripples of the power factor correction flyback converter.

BACKGROUND

As technologies further advance, a variety of computing devices such as laptops, mobile phones, tablet PCs, digital cameras, MP3 players and/or the like, have become popular. A computing device receives power from a power source. The power source may be a power conversion system converting power from an alternating current (ac) power supply to a regulated direct current (dc) voltage.

The power conversion system may include an electromagnetic interference filter (EMI) filter, a rectifier and a flyback converter connected in cascade between the ac power supply and an output port coupled to the computing device. The EMI filter of the power conversion system is used to suppress conducted EMI noise from the ac power supply. The rectifier is connected directly to the output terminals of the EMI filter. The rectifier is able to convert the input ac waveform to a rectified waveform at the output terminals of the rectifier. The flyback converter is used to perform a power factor correction (PFC) on the ac power supply and generate a regulated dc voltage at the output port.

FIG. 1 illustrates a schematic diagram of a flyback converter. The flyback converter is coupled between a power source Vi and a load. The power source Vi is a rectified waveform generated by the rectifier. The flyback converter comprises a first winding L1, a first switch S1, a second winding L2, a second switch S2 and an output capacitor Co. The first winding L1 is magnetically couple to the second winding L2 through a magnetic core of the flyback converter. As shown in FIG. 1, the number of turns in L1 is N. The number of turns in L2 is 1. The current flowing through L1 is denoted as $I_S$. The voltage across L1 is denoted as V1. The voltage across S1 is denoted as $V_S$. The current flowing through L2 is denoted as Id. The voltage across L2 is denoted as V2.

In operation, the flyback converter is configured to operate in a discontinuous current mode (DCM) to perform a power factor correction on the power source Vi. The flyback converter is able to convert the input voltage into a predetermined low voltage (e.g., 24 V). One problem with the flyback converter shown in FIG. 1 is that the output voltage of the flyback converter has a 120 Hz ripple. This ripple is a byproduct of performing the power factor correction on the input ac power source. To cure this deficiency, a large output capacitor is required for attenuating the 120 Hz output ripple.

FIG. 2 illustrates various waveforms associated with the flyback converter shown in FIG. 1. The horizontal axis of FIG. 2 represents intervals of time. There may be five rows in FIG. 2. The first row represents the current ($I_S$) flowing through the first winding L1. The second row represents the current (Id) flowing through the second winding L2. The third row represents the magnetic flux in the magnetic core of the flyback converter. The fourth row represents the voltage across the first switch S1. The fifth row represents the voltage across the second winding L2.

The current ($I_S$) flowing through the first winding L1 is the input current of the flyback converter. The average input current ($I_{IN}$) of the flyback converter can be calculated from the following equation:

$$I_{IN} = \frac{T_{ON} \times I_{PK}}{2T} \quad (1)$$

In Equation (1), $I_{PK}$ is the peak current of $I_S$ as shown in FIG. 2. $T_{ON}$ is the on time of S1. T is the switching cycle of the flyback converter.

$I_{PK}$ depends on $V_i$ and the primary inductance (L1) of the first winding L1. $I_{PK}$ can be expressed by the following equation:

$$I_{PK} = \frac{T_{ON} \times V_i}{L_1} \quad (2)$$

$I_{PK}$ in Equation (1) can be substituted by $I_{PK}$ in Equation (2). After this substitution, $I_{IN}$ can be expressed by the following equation:

$$I_{IN} = \frac{T_{ON}^2 \times V_i}{2TL_1} \quad (3)$$

In operation, the control circuit of the flyback converter is configured such that $T_{ON}$ and T are constant over a line cycle of the input ac power source. Once $T_{ON}$ and T are constant over one line cycle, $I_{IN}$ will be proportional to $V_i$. Accordingly, the flyback converter is able to achieve the power factor correction function.

FIG. 3 illustrates various waveforms associated with the flyback converter shown in FIG. 1. The horizontal axis of FIG. 3 represents intervals of time. There may be five rows in FIG. 1. The first row represents the ac line voltage (Vin). The second row represents the ac input current (Iin). The three row represents the voltage (Vi) fed into the flyback converter. The fourth row represents the power (Pin) fed into the flyback converter and the power (Pout) delivered by the flyback converter. The fifth row represents the voltage (Vo) at the output of the flyback converter shown in FIG. 1.

As shown in FIG. 3, Vin is a sinusoidal waveform. Iin is another sinusoidal waveform in phase with Vin. Vi is a rectified waveform generated by a full-wave rectifier. As shown in FIG. 3, the frequency of Vi is twice of the frequency of Vin. The frequency is doubled because both the positive and negative sides of the waveform of Vin are rectified to generate Vi. The period of the sinusoidal waveform (e.g., Vin) is a line cycle of the ac line voltage. The period of Vi is a half line cycle of the ac line voltage Vin. Pout is a dc line. Pin is sinusoidal waveform. The portion of Pin over the dc line indicates that the input power is greater than the power demanded by the load coupled to the output of the flyback converter. The portion of Pin below the dc line indicates that the input power is less than the power demanded by the load coupled to the output of the flyback converter. Due to the mismatch between the input power and the output power, the output voltage fluctuates around the voltage regulation point as shown in FIG. 3. The voltage fluctuation generates the output ripple. As shown in FIG. 3, the frequency of the output ripple is twice of the frequency of Vin. Vin is of a frequency of 60 Hz. As such, the output ripple is of a frequency of 120 Hz.

As shown in FIG. 3, the output ripple of the flyback converter is quite significant. Increasing the feedback loop bandwidth can reduce the ripple. However, such a bandwidth change may severely degrade the power factor. As a result, the ripple can only be directly reduced by increasing the output capacitor. Alternatively, the flyback converter may be followed by a downstream switching regulator with a separate independent magnetic component. The downstream switching regulator is connected to the output of the flyback converter. The downstream switching regulator is able to produce an output voltage free from the ripple and well regulated with a faster control loop. This solution produces a good quality output, but adds more components into the power conversion system, thereby increasing the cost and complexity of the power conversion system. It would be desirable to have a simple apparatus and control scheme for attenuating the output ripple of the flyback converter. The present disclosure addresses this need.

SUMMARY

These and other problems are generally solved or circumvented, and technical advantages are generally achieved, by preferred embodiments of the present disclosure which provide an apparatus and control method for reducing output ripples of a power factor correction flyback converter.

In accordance with an embodiment, an apparatus comprises a first winding and a first switch connected in series between an input terminal and ground, a second winding magnetically coupled to the first winding and coupled to an output terminal through a rectifier device, a third winding magnetically coupled to the first winding and connected in series with a fourth switch, a fourth winding magnetically coupled to the first winding and connected in series with a third switch, and an energy storage device connected between a common node of the third winding and the fourth winding, and a common node of the third switch and the fourth switch.

In accordance with another embodiment, a method comprises configuring a flyback power converter to perform a power factor correction on an ac power source and generate a regulated dc voltage fed into a load, upon detecting that input energy from the ac power source is less than output energy required by the load, transferring energy from an energy storage device of a ripple cancellation apparatus to a magnetic core of the flyback power converter until a sum of the energy from the ac power source and the energy transferred from the energy storage device is approximately equal to the output energy required by the load, and upon detecting that the input energy from the ac power source is greater than the output energy required by the load, transferring energy from the magnetic core of the flyback power converter to the energy storage device until energy in the magnetic core of the flyback power converter is approximately equal to the output energy required by the load.

In accordance with yet another embodiment, a system comprises a flyback converter configured to perform a power factor correction on an ac power source and generate a regulated dc voltage fed into a load, and a ripple cancellation apparatus comprising a plurality of windings magnetically coupled to windings of the flyback converter through a magnetic core of the flyback converter, and an energy storage device coupled to the plurality of windings through respective switches, wherein the ripple cancellation apparatus is configured such that output ripples of the flyback converter cancel each other.

The foregoing has outlined rather broadly the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures or processes for carrying out the same purposes of the present disclosure. It should also be realized by those skilled in the art that such equivalent constructions do not depart from the spirit and scope of the disclosure as set forth in the appended claims.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the various embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present disclosure provides many applicable inventive concepts that can be embodied in a wide variety of specific contexts. The specific embodiments discussed are merely illustrative of specific ways to make and use the disclosure, and do not limit the scope of the disclosure.

The present disclosure will be described with respect to preferred embodiments in a specific context, namely an apparatus and control method for reducing or eliminating output ripples of a power factor correction flyback converter. The invention may also be applied, however, to a variety of power converters. Hereinafter, various embodiments will be explained in detail with reference to the accompanying drawings.

Figure 1:
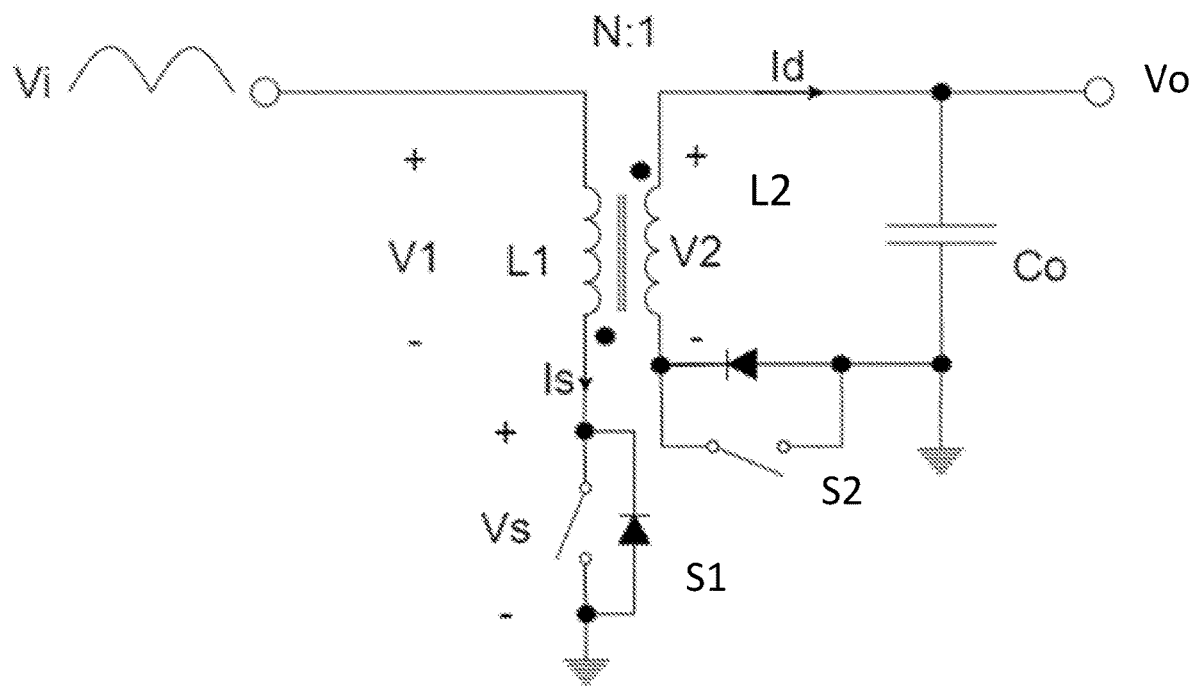
FIG. 1 illustrates a schematic diagram of a flyback converter.
Figure 2:
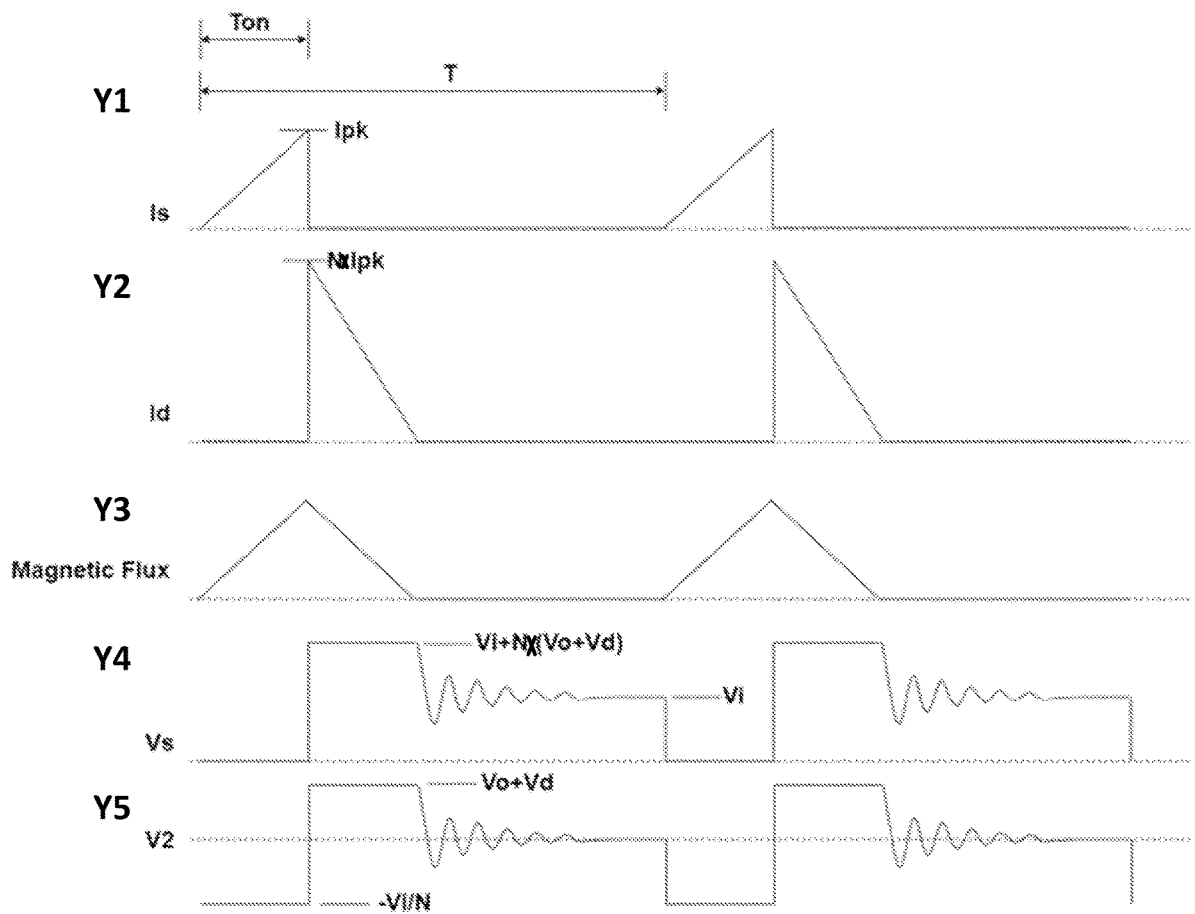
FIG. 2 illustrates various waveforms associated with the flyback converter shown in FIG. 1.
Figure 3:
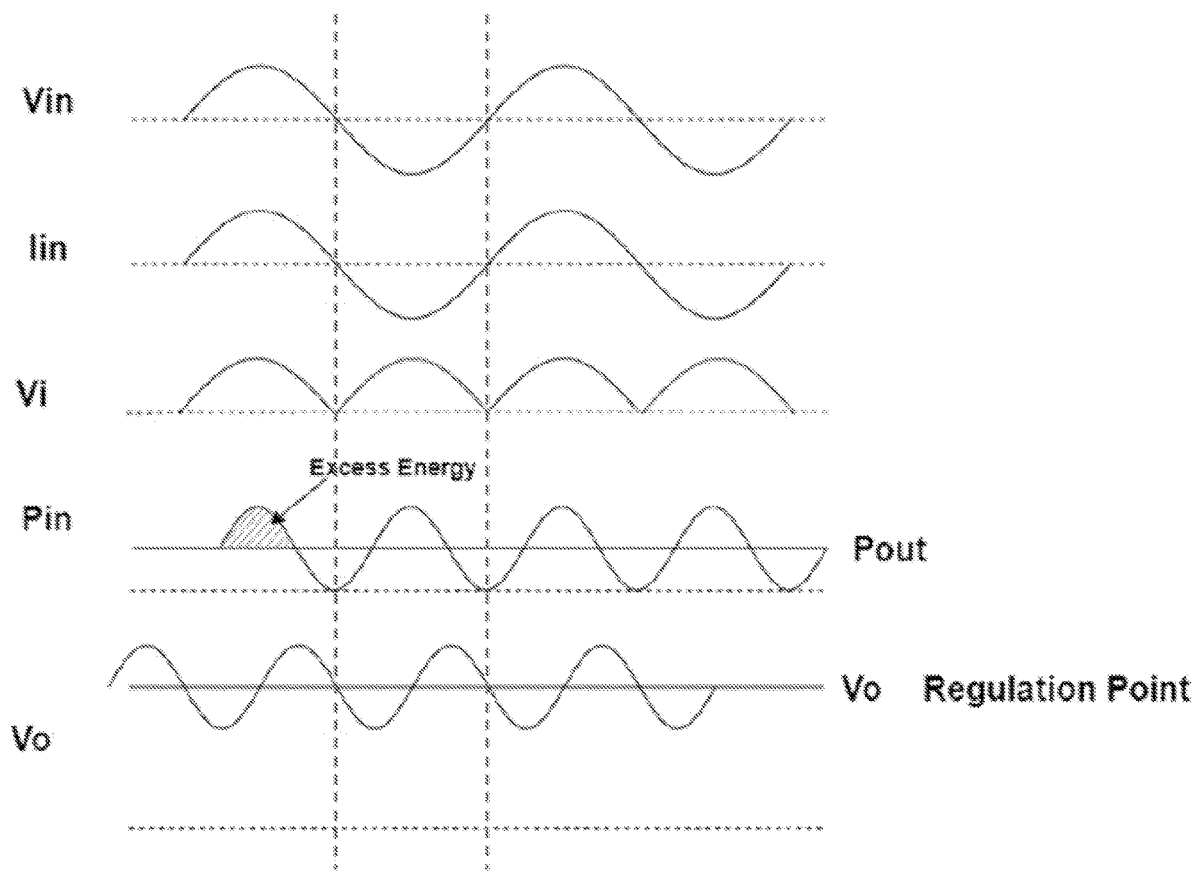
FIG. 3 illustrates various waveforms associated with the flyback converter shown in FIG. 1.
Figure 4:
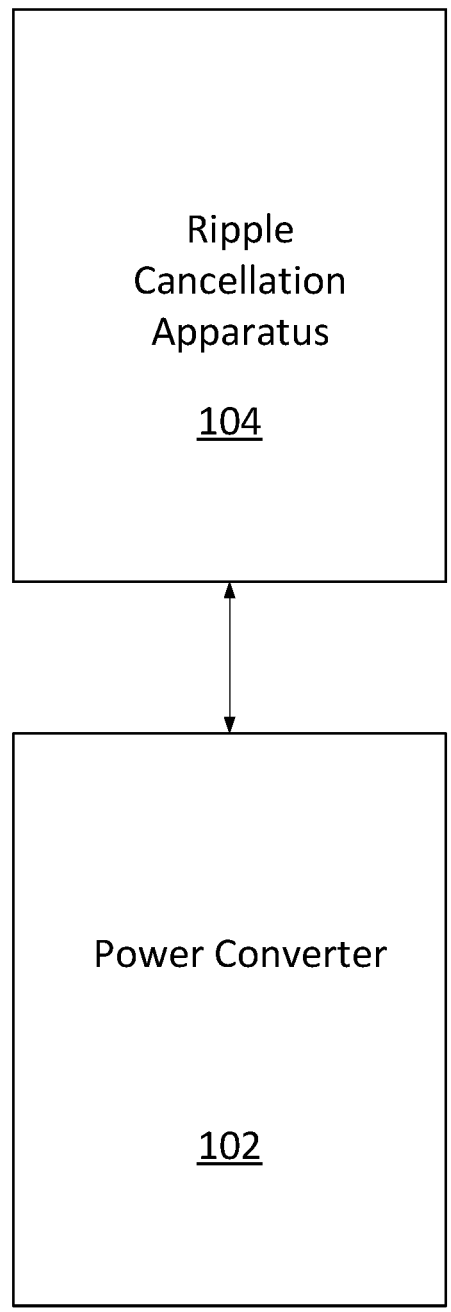
FIG. 4 illustrates a block diagram of a flyback converter and the associated ripple cancellation apparatus in accordance with various embodiments of the present disclosure.

FIG. 4 illustrates a block diagram of a flyback converter and the associated ripple cancellation apparatus in accordance with various embodiments of the present disclosure. A flyback converter 102 is coupled to a ripple cancellation apparatus 104. The flyback converter 102 is configured to perform a power factor correction on an ac power source and generate a regulated dc voltage fed into a load. The ripple cancellation apparatus 104 comprises a plurality of windings magnetically coupled to windings of the flyback converter through a magnetic core of the flyback converter. The ripple cancellation apparatus 104 further comprises an energy storage device coupled to the plurality of windings through respective switches. The ripple cancellation apparatus is configured such that the output ripples of the flyback converter cancel each other.

In operation, upon detecting that input energy of the flyback converter is less than output energy demanded by the load, the ripple cancellation apparatus 104 is configured to provide energy to the magnetic core of the flyback converter until energy stored in the magnetic core of the flyback converter is able to satisfy the demand of the load. Once the energy in the magnetic core of the flyback converter is equal to the energy demanded by the load, the secondary side switch of the flyback converter is turned on, and the energy stored in the magnetic core of the flyback converter is released by the secondary side winding of the flyback converter. Since the energy stored in the magnetic core is equal to the energy demanded by the load, there is no ripple at the output of the flyback converter 102.

In operation, upon detecting that the input energy of the flyback converter is greater than the output energy demanded by the load, the energy stored in the magnetic core of the flyback converter is transferred to the energy storage device of the ripple cancellation apparatus 104 until the energy stored in the magnetic core is reduced to a level equal to the energy demanded by the load. Once the energy in the magnetic core of the flyback converter is equal to the energy demanded by the load, the secondary side switch of the flyback converter is turned on, and the energy stored in the magnetic core of the flyback converter is released by the secondary side winding of the flyback converter. Since the energy stored in the magnetic core is equal to the energy demanded by the load, there is no ripple at the output of the flyback converter 102.

Figure 5:
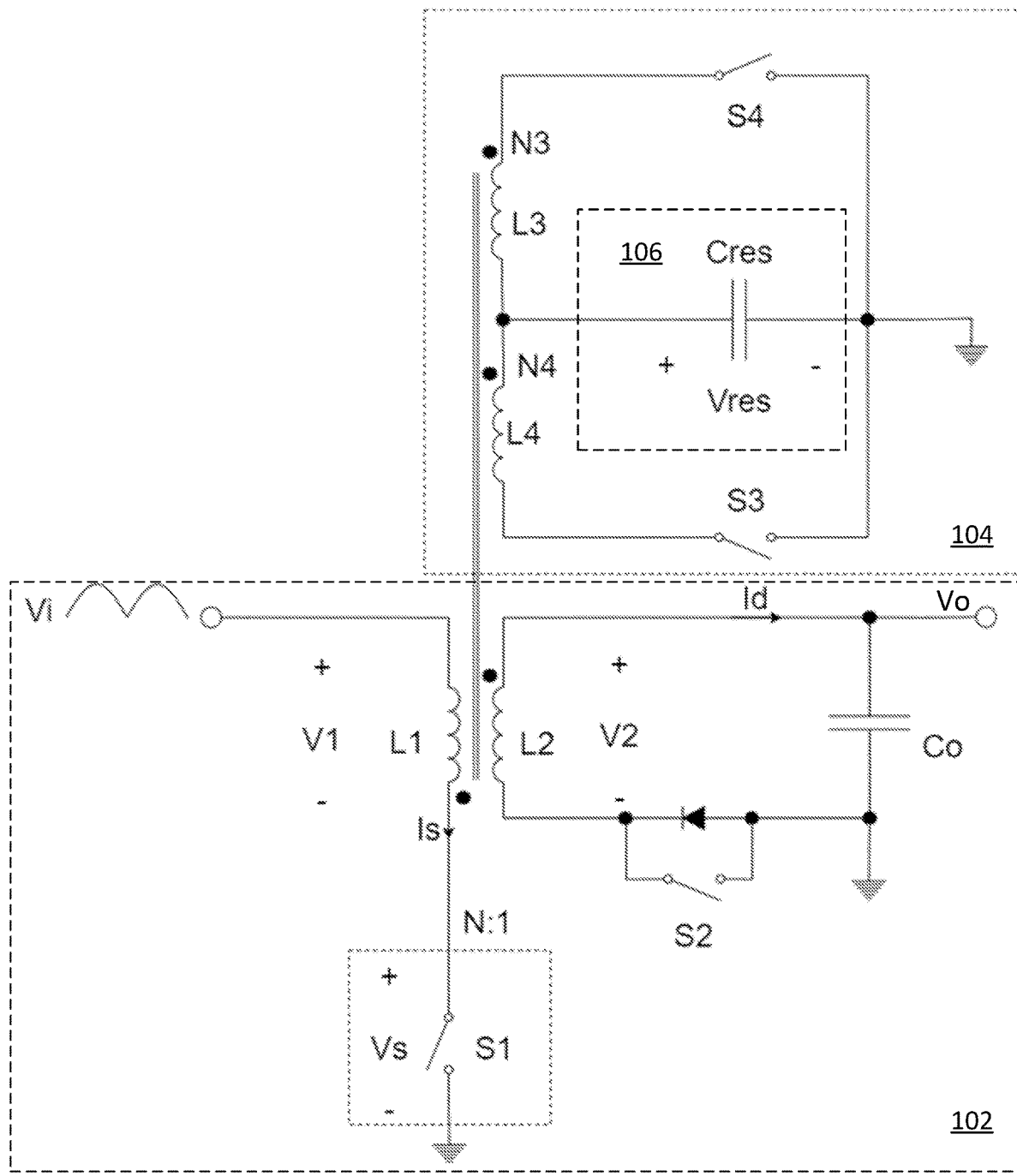
FIG. 5 illustrates a schematic diagram of the flyback converter and the associated ripple cancellation apparatus shown in FIG. 4 in accordance with various embodiments of the present disclosure.

FIG. 5 illustrates a schematic diagram of the flyback converter and the associated ripple cancellation apparatus shown in FIG. 4 in accordance with various embodiments of the present disclosure. The flyback converter 102 is configured as a power factor correction apparatus. An input terminal of the flyback converter 102 is coupled to an ac power supply Vi. An output terminal of the flyback converter 102 is coupled to a load (not shown). Furthermore, the flyback converter 102 is configured to receive a full-wave rectified ac voltage and convert the full-wave rectified ac voltage into a regulated dc voltage.

As shown in FIG. 5, the flyback converter 102 comprises a first winding L1, a first switch S1, a second winding L2, a second switch S2 and an output capacitor Co. As shown in FIG. 5, the number of turns in L1 is N. The number of turns in L2 is 1. The current flowing through L1 is denoted as $I_S$. The voltage across L1 is denoted as V1. The voltage across S1 is denoted as $V_S$. The current flowing through L2 is denoted as Id. The voltage across L2 is denoted as V2.

As shown in FIG. 5, the first winding L1 and the first switch S1 are connected in series between the input terminal of the flyback converter 102 and ground. The second winding L2 is magnetically coupled to the first winding L1 through the magnetic core of the flyback converter 102. The second winding L2 is coupled to an output terminal of the flyback converter through a rectifier device. In some embodiments, the rectifier device is implemented as a second switch as shown in FIG. 5. In alternative embodiments, the rectifier device is implemented as a diode.

The ripple cancellation apparatus 104 comprises a third winding L3, a fourth winding L4, a third switch S3, a fourth switch S4 and an energy storage device 106. As shown in FIG. 5, the number of turns in L3 is N3. The number of turns in L4 is N4. The voltage across the energy storage device 106 is denoted as Vres.

As shown in FIG. 5, the third winding L3 is magnetically coupled to the first winding L1 through the magnetic core of the flyback converter 102. The third winding L3 is connected in series with the fourth switch S4. The fourth winding L4 is magnetically coupled to the first winding L1 through the magnetic core of the flyback converter 102. The fourth winding L4 is connected in series with the third switch S3.

As shown in FIG. 5, the energy storage device 106 is implemented as a capacitor Cres. The capacitor Cres is connected between a common node of the third winding L3 and the fourth winding L4, and a common node of the third switch S3 and the fourth switch S4. More particularly, a positive terminal of the capacitor Cres is connected to the common node of the third winding L3 and the fourth winding L4. A negative terminal of the capacitor Cres is connected to the common node of the third switch S3 and the fourth switch S4, and further connected to ground.

As shown in FIG. 5, a first terminal of the first winding L1 is connected to the input terminal of the flyback converter 102. A second terminal of the first winding L1 is connected to the first switch S1. A first terminal of the second winding L2 is connected to the output terminal of the flyback converter 102. A second terminal of the second winding L2 is connected to the second switch S2. A first terminal of the third winding L3 is connected to the fourth switch S4. A second terminal of the third winding L3 is connected to the energy storage device 106. A first terminal of the fourth winding L4 is connected to the energy storage device 106. A second terminal of the fourth winding L4 is connected to the third switch S3, As indicated by the dots of the windings L1, L2, L3 and L4, the second terminal of the first winding L1, the first terminal of the second winding L2, the first terminal of the third winding L3 and the first terminal of the fourth winding L4 share a same polarity.

In some embodiments, the first switch S1, the third switch S3 and the fourth switch S4 are isolation switches. In some embodiments, the isolation switch can be implemented as two back-to-back connected MOSFETs.

In accordance with an embodiment, the switches of FIG. 5 may be formed by MOSFET devices. Alternatively, the switches can be formed by any controllable switches such as insulated gate bipolar transistor (IGBT) devices, integrated gate commutated thyristor (IGCT) devices, gate turn-off thyristor (GTO) devices, silicon controlled rectifier (SCR) devices, junction gate field-effect transistor (JFET) devices, MOS controlled thyristor (MCT) devices, gallium nitride (GaN) based power devices, silicon carbide (SiC) based power devices and the like.

In some embodiments, the switches shown in FIG. 5 are implemented as n-type transistors. A person skilled in the art would recognize there may be many variations, modifications and alternatives. For example, depending on different applications and design needs, the switches shown in FIG. 5 may be implemented as p-type transistors. Furthermore, the switch shown in FIG. 5 may be implemented as a plurality of switches connected in parallel. Moreover, a capacitor may be connected in parallel with the switch to achieve zero voltage switching (ZVS)/zero current switching (ZCS).

In operation, upon detecting that the input energy of the flyback converter 102 is less than the output energy demanded by a load coupled to the flyback converter 102 (this usually occurs at the beginning of a line cycle where Vi is at its valley), the fourth switch S4 is turned on once the first switch S1 is turned off, and the fourth switch S4 remains on until energy stored in the magnetic core of the flyback converter 102 is increased to a first predetermined level equal to the energy demanded by the load. During the on time of S4, the energy in the energy storage device 106 is transferred to the magnetic core of the flyback converter 102. The operating principle of this energy transfer process (from the energy storage device to the magnetic core) will be discussed in detail with respect to FIG. 5.

In operation, upon detecting that the input energy of the flyback converter 102 is greater than the output energy demanded by the load coupled to the flyback converter 102 (this usually occurs in the middle of a line cycle where Vi is close to its peak voltage), the third switch S3 is turned on once the first switch S1 is turned off, and the third switch S3 remains on until energy stored in the magnetic core of the flyback converter 102 is reduced to a second predetermined level equal to the energy demanded by the load. During the on time of S3, the energy in the magnetic core of the flyback converter 102 is transferred to the energy storage device 106. The operating principle of this energy transfer process (from the magnetic core to the energy storage device) will be discussed in detail with respect to FIG. 6.

Figure 6:
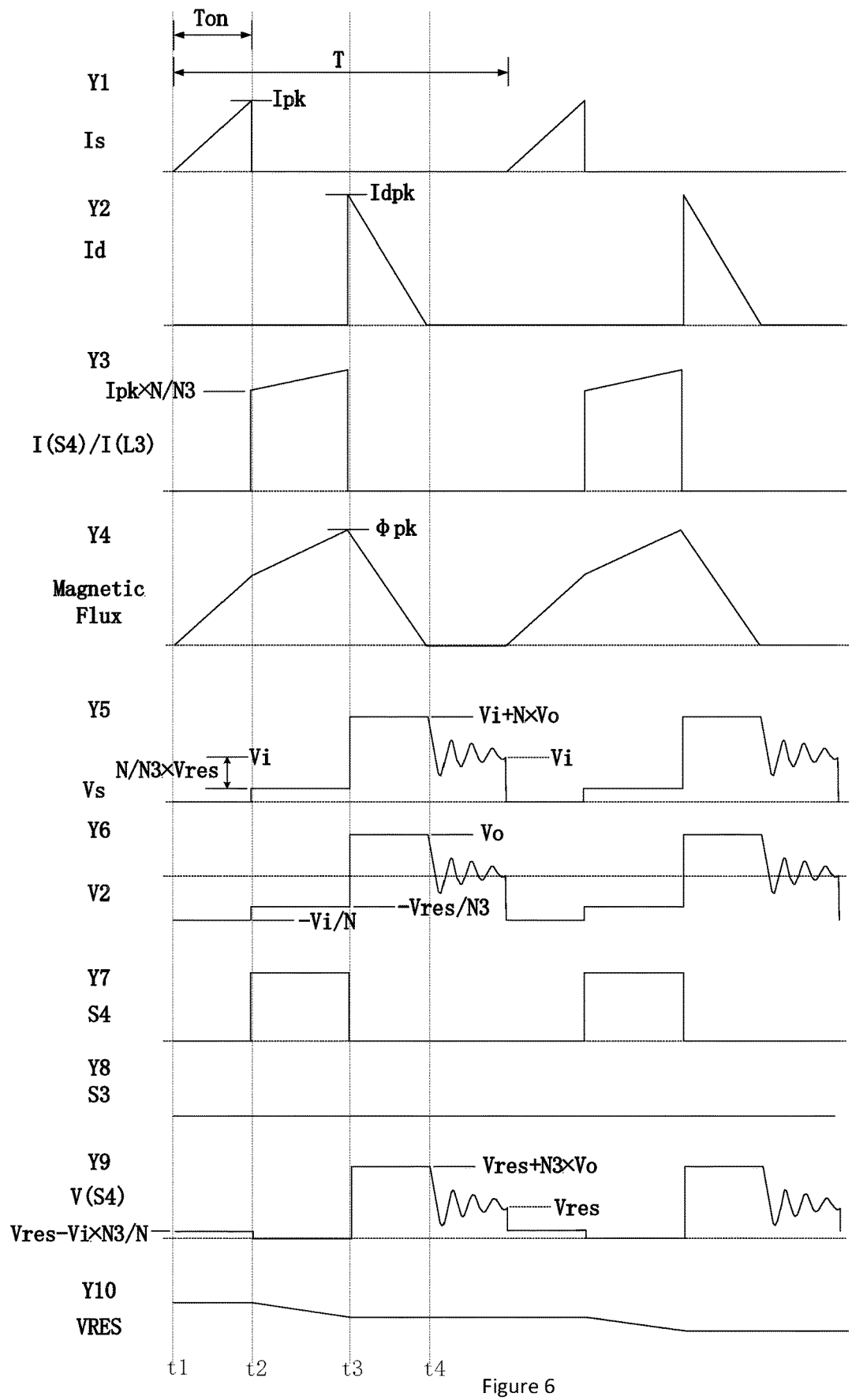
FIG. 6 illustrates a variety of signals associated with the flyback converter and the ripple cancellation apparatus shown in FIG. 5 when energy is extracted from the energy storage device in accordance with various embodiments of the present disclosure.

FIG. 6 illustrates a variety of signals associated with the flyback converter and the ripple cancellation apparatus shown in FIG. 5 when energy is extracted from the energy storage device in accordance with various embodiments of the present disclosure. The horizontal axis of FIG. 6 represents intervals of time. There may be ten rows in FIG. 6. The first row represents the current ($I_S$) flowing through the first winding L1. The second row represents the current (Id) flowing through the second winding L2. The third row represents the current flowing through the third winding L3. The fourth row represents the magnetic flux in the magnetic core of the flyback converter. The fifth row represents the voltage across the first switch S1. The sixth row represents the voltage across the second winding L2. The seventh row represents the gate drive voltage of the fourth switch S4. The eighth row represents the gate drive voltage of the third switch S3. The ninth row represents the voltage across the fourth switch S4. The tenth row represents the voltage across the capacitor Cres.

At t1, the first switch S1 is turned on. In response to the turn-on of S1, the current flowing through L1 increases from 0 to Ipk in a linear manner from t1 to t2 with a slope of $Vi/L_1$. $L_1$ is the inductance of L1. The magnetic flux is built up in the magnetic core of the flyback converter from t1 to t2. During this period, both S3 and S4 are turned off. As shown in FIG. 6, the voltage across S4 can be expressed by the following equation:

$$V(S4) = Vres - Vi\frac{N3}{N} \tag{4}$$

In Equation (4), V(S4) is the voltage across S4. Vres is the voltage across Cres. Vi is the input voltage fed into the flyback converter 102. N3 is the number of turns in L3. N is the number of turns in L1. Thus, Vi×N3/N represents the induced voltage across L3 once the current flows through L1.

From t1 to t2, the voltage (V2) across the second winding L2 can be expressed by the following equation:

$$V2 = -Vi\frac{1}{N} \tag{5}$$

At t2, the first switch S1 is turned off and the fourth switch S4 is turned on. In response to the turn-off of S1, the current flowing through L1 drops to zero. In response to the turn-on of S4, the current flowing through L3 jumps to Ipk×N/N3, then gradually increases in a near linear manner from t2 to t3 with a slope defined by $Vres/L_3$. $L_3$ is the inductance of L3. The magnetic flux keeps going up in a near linear manner from t2 to t3. The rise of the magnetic flux in the magnetic core is not exactly linear since the voltage Vres decreases as Cres is discharged through L3, and the slope of the rise of the magnetic flux is proportional to the variation of Vres. At t3, the magnetic flux reaches a predetermined magnetic flux peak $\varphi_{pk}$. At the same time, the energy stored in the magnetic core reaches a level equal to the energy demanded by the load. From t2 to t3, the voltage across S1 can be expressed by the following equation:

$$Vs = Vi - Vres\frac{N}{N3} \tag{6}$$

It should be noted that Vs may be of a negative value during some operating conditions. In order to protect the body diode of S1 from being damaged, S1 should be implemented as an isolation switch.

From t2 to t3, the voltage across the second winding L2 can be expressed by the following equation:

$$V2 = -Vres\frac{1}{N3} \tag{7}$$

During t2 to t3, energy is extracted from Cres after S4 is turned on. As shown in FIG. 6, the voltage across Cres drops in a linear manner from t2 to t3.

At t3, the fourth switch S4 is turned off, and the second switch S2 is turned on. In response to the turn-off of S4, the current flowing through L3 drops to zero at t3. In response to the turn-on of S2, the energy stored in the magnetic core of the flyback converter is released by the second winding L2. As shown in FIG. 6, the current flowing through L2 decreases in a linear manner from a peak value Idpk to zero.

Once the energy of the magnetic core is released into the secondary side of the flyback converter 102, the magnetic flux reduces in a linear manner from the peak value $\varphi_{pk}$ to zero. From t3 to t4, the voltage across S1 can be expressed by the following equation:

$$Vs = Vi + Vo \times N \quad (8)$$

In Equation (8), Vo is the output voltage of the flyback converter 102.

From t3 to t4, the voltage across the second winding L2 can be expressed by the following equation:

$$V2 = Vo \quad (9)$$

From t3 to t4, the voltage across S4 can be expressed by the following equation:

$$V(S4) = Vres + Vo \times N3 \quad (10)$$

From t3 to t4, the voltage across Cres remains the same as shown in FIG. 6. From t4, the voltages waveforms of the flyback converter 102 are the same as the voltage waveforms of the conventional flyback converter. For example, once the energy in the magnetic core is fully depleted at t4, the voltage across S1 starts to ring at a frequency determined by parasitic parameters.

Figure 7:
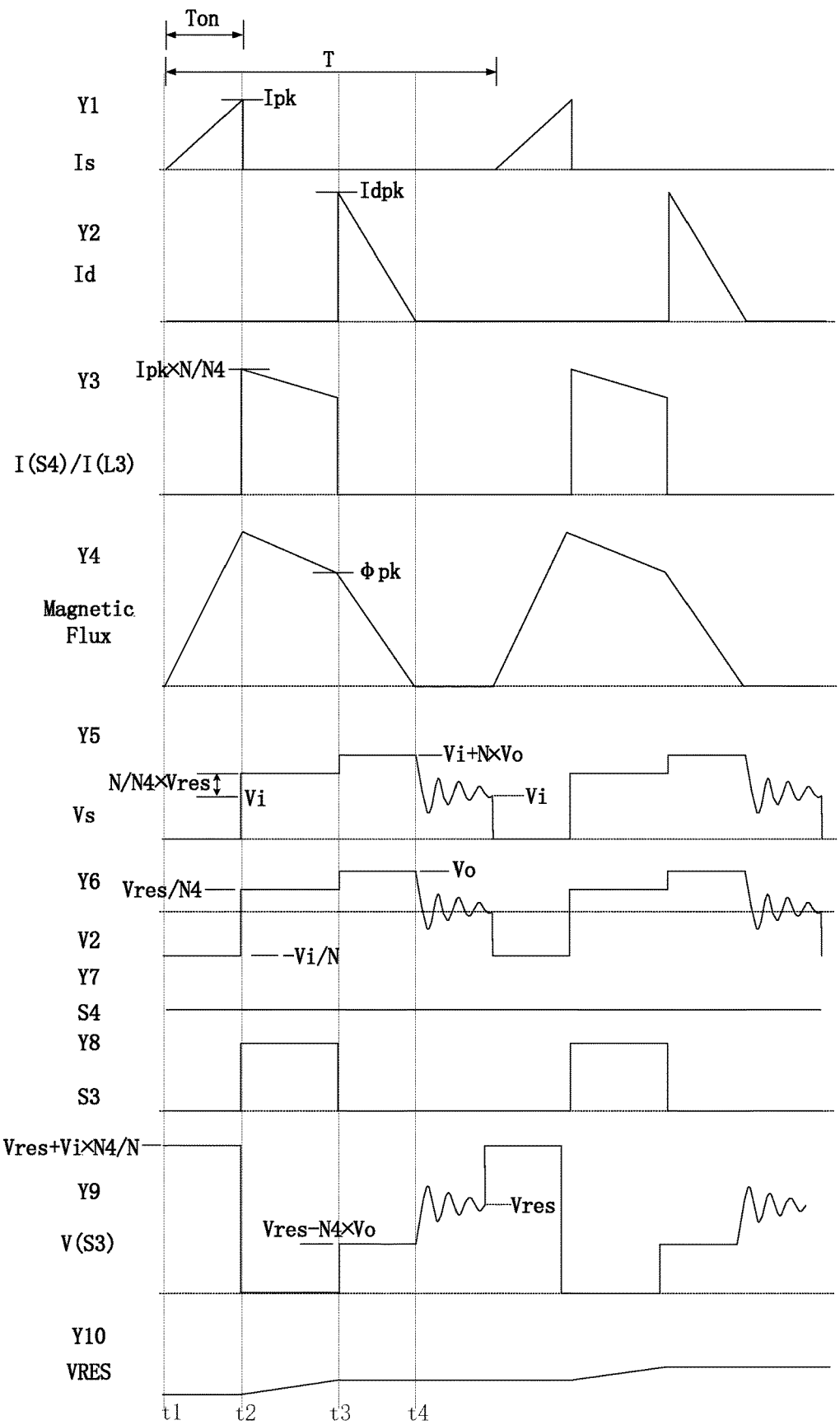
FIG. 7 illustrates a variety of signals associated with the flyback converter and the ripple cancellation apparatus shown in FIG. 5 when energy is stored into the energy storage device in accordance with various embodiments of the present disclosure.

FIG. 7 illustrates a variety of signals associated with the flyback converter and the ripple cancellation apparatus shown in FIG. 5 when energy is stored into the energy storage device in accordance with various embodiments of the present disclosure. The horizontal axis of FIG. 7 represents intervals of time. There may be ten rows in FIG. 7. The first row represents the current ($I_S$) flowing through the first winding L1. The second row represents the current (Id) flowing through the second winding L2. The third row represents the current flowing through the fourth winding L4. The fourth row represents the magnetic flux in the magnetic core of the flyback converter. The fifth row represents the voltage across the first switch S1. The sixth row represents the voltage across the second winding L2. The seventh row represents the gate drive voltage of the fourth switch S4. The eighth row represents the gate drive voltage of the third switch S3. The ninth row represents the voltage across the third switch S3. The tenth row represents the voltage across the capacitor Cres.

At t1, the first switch S1 is turned on. In response to the turn-on of S1, the current flowing through L1 increases from 0 to Ipk in a linear manner from t1 to t2 with a lope defined by Vi/$L_1$. The magnetic flux is built up in the magnetic core of the flyback converter 102 from t1 to t2. During this period, both S3 and S4 are turned off. As shown in FIG. 7, the voltage across S3 can be expressed by the following equation:

$$V(S3) = Vres + Vi \frac{N4}{N} \quad (11)$$

In Equation (11), V(S3) is the voltage across S3. N4 is the number of turns in L4.

From t1 to t2, the voltage (V2) across the second winding L2 can be expressed by the following equation:

$$V2 = -Vi \frac{1}{N} \quad (12)$$

At t2, the first switch S1 is turned off and the third switch S3 is turned on. In response to the turn-off of S1, the current flowing through L1 drops to zero. In response to the turn-on of S3, the current flowing through L4 jumps to a level of Ipk×N4/N, and then starts to decrease in a near linear manner from t2 to t3. The slope of the decrease of the current through the winding L4 is defined by Vres/$L_4$. $L_4$ is the inductance value of the winding L4. The magnetic flux drops in a near linear manner from t2 to t3. The decrease of the magnetic flux in the magnetic core is not exactly linear since the voltage Vres decreases as Cres is charged by the current flowing through L4, and the slop of the fall of the magnetic flux is proportional to the variation of Vres. At t3, the magnetic flux reaches a predetermined magnetic flux value $\varphi_{pk}$. At the same time, the energy stored in the magnetic core is reduced to a level equal to the energy demanded by the load. From t2 to t3, the voltage across S1 can be expressed by the following equation:

$$Vs = Vi + Vres \frac{N}{N4} \quad (13)$$

From t2 to t3, the voltage across the second winding L2 can be expressed by the following equation:

$$V2 = Vres \frac{1}{N4} \quad (14)$$

During t2 to t3, energy is added into Cres after S3 is turned on. As shown in FIG. 7, the voltage across Cres increases in a linear manner from t2 to t3.

At t3, the third switch S3 is turned off, and the second switch S2 is turned on. In response to the turn-off of S3, the current flowing through L4 drops to zero at t3. In response to the turn-on of S2, the energy stored in the magnetic core of the flyback converter 102 is released into the secondary side of the flyback converter 102. As shown in FIG. 7, the current flowing through L2 decrease in a linear manner from a peak value Idpk to zero. Once the energy is released into the secondary side of the flyback converter 102, the magnetic flux reduces in a linear manner from $\varphi_{pk}$ to zero. From t3 to t4, the voltage across S1 can be expressed by the following equation:

$$Vs = Vi + Vo \times N \quad (15)$$

From t3 to t4, the voltage across the second winding L2 can be expressed by the following equation:

$$V2 = Vo \quad (16)$$

From t3 to t4, the voltage across S3 can be expressed by the following equation:

$$V(S3) = Vres - Vo \times N4 \quad (17)$$

It should be noted that the value of N4 has to be chosen so that Vo is greater than Vres/N4. Vres can be clamped to the right voltage to make this relation true.

From t3 to t4, the voltage across Cres remains the same as shown in FIG. 7. From t4, the voltages waveforms of the flyback converter 102 are the same as the voltage waveforms of the conventional flyback converter. For example, once the energy in the magnetic core is fully depleted at t4, the voltage across S1 starts to ring at a frequency determined by parasitic parameters.

It should be noted that the same energy is provided to the output even when the energy pumped into the transformer from the primary side is varying. As such, the primary side waveform remains untouched, thereby keeping the power factor the same.

One advantageous feature of having the ripple cancellation apparatus 104 is that by using the energy storage device, the energy provided to the output is equal to the energy demanded by the load. Such a balance helps eliminate or reduce the output ripples of the flyback converter 102. Once the output ripples (120 Hz) have been eliminated, lower value capacitors can be used at the output of the flyback converter 102.

Figure 8:
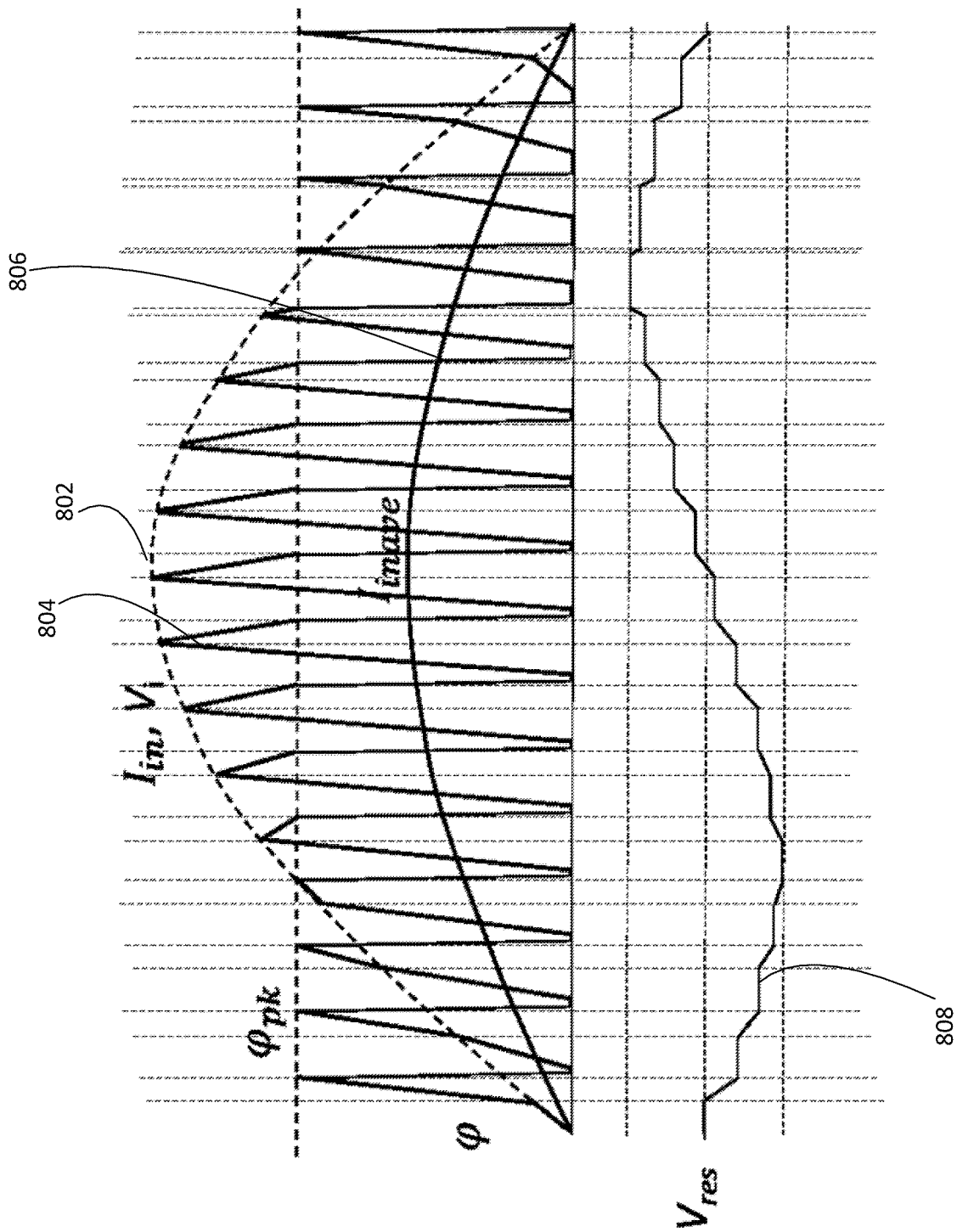
FIG. 8 illustrates various waveforms of the flyback converter shown in FIG. 5 in accordance with various embodiments of the present disclosure.

FIG. 8 illustrates various waveforms of the flyback converter shown in FIG. 5 in accordance with various embodiments of the present disclosure. As shown in FIG. 8, waveform 802 represents the voltage (Vi) and the input current (Iin) of the power source coupled to the flyback converter. Iin is in phase with Vi. Waveform 804 is the magnetic flux in the magnetic core of the flyback converter. Waveform 806 is the average input current. Waveform 808 is the voltage across Cres. It should be noted that Vi is equal to Iin. Iin is in phase with Vi. For simplicity, only one waveform is used to represent both Vi and Iin.

The waveforms in FIG. 8 illustrate the operating principle of the flyback PFC converter with ripple cancellation over a half line cycle. As shown in FIG. 8, the Iin/Vi line shows the rectified input voltage Vi and input current Iin over a half line cycle, which is also the envelope of the peak primary side current Ipk. Waveform 804 is a zigzag-shaped curve showing the change of the total magnetic flux within the magnetic core of the flyback converter.

As shown in FIG. 8, there are multiple switching cycles within the half line cycle. Within each switching cycle of the flyback converter, the magnetic flux in the magnetic core is first charged to a first level defined by the envelope of the input ac voltage Vi. Then, if the total magnetic flux in the core is less than a predetermined peak flux $\varphi_{pk}$, switch S4 is turned on to discharge Cres through winding L3 so as to increase the magnetic flux in the magnetic core to $\varphi_{pk}$. On the other hand, if the total magnetic flux in the magnetic core is greater than the predetermined peak flux $\varphi_{pk}$, switch S3 is turned on. Once S3 is turned on, the excess magnetic flux in the magnetic core is used to charge Cres through winding L4, thereby reducing the magnetic flux in the magnetic core to $\varphi_{pk}$. When the total magnetic flux in the core reaches the predetermined peak flux $\varphi_{pk}$, switch S2 is turned on, and then the energy stored in the magnetic core is delivered to the output Vo through the secondary side circuit (L2 and S2) of the flyback converter.

At the beginning of the half line cycle, the rectified ac voltage Vi is near zero. During the Ton duration of a switching cycle, the magnetic flux inside the magnetic core cannot be sufficiently charged to the predetermined peak flux $\varphi_{pk}$. Therefore, at the end of Ton, switch S4 is turned on to allow energy stored in Cres to discharge through winding L3 so as to increase the magnetic flux in the magnetic core. The rate at which the magnetic flux in the core increases is determined by the voltage across Cres (Vres) and the inductance of the winding L3. The rate is equal to Vres/L$_3$. A higher Vres results in a faster increase in the magnetic flux.

At the beginning of the half line cycle, Vres is at its average value as shown in FIG. 8. As time progresses, the line voltage increases. The magnetic flux increases faster and gets closer to the predetermined peak flux $\varphi_{pk}$ during the Ton duration of a switching cycle. As a result, less and less energy transferred from Cres to the magnetic core is required after Ton. However, some energy is still transferred from Cres to the magnetic core during every switching cycle. As a result, the voltage across Cres (Vres) continues to drop as shown in FIG. 8. When the input voltage Vi reaches a point where during the Ton duration of a switching cycle, the magnetic core can be charged to the predetermined peak flux $\varphi_{pk}$ without turning on S3 or S4, the voltage across Cres reaches its minimum as shown in FIG. 8.

As the input voltage Vi continues to rise, the magnetic core can be charged to a level exceeding the predetermined peak flux y$_{pk}$ during the Ton duration of a switching cycle. Therefore, at the end of Ton, switch S3 is turned on to allow the excess energy stored in the magnetic core to be discharged through winding L4. The excess energy is used to charge Cres. The rate at which the magnetic flux in the magnetic core decreases is determined by Vres/L$_4$. Vres is the voltage across Cres, and L$_4$ is the inductance of winding L4. The capacitor Cres continues to be charged by the excess magnetic flux built up during the Ton duration of every switching cycle until the input voltage Vi rises to its peak, and then falls to a level at which during the Ton duration of a switching cycle, the magnetic flux in the magnetic core is charged to a level approximately equal to the predetermined peak flux y$_{pk}$ without turning on S3 or S4. At this point, the voltage across Cres reaches its peak in this half line cycle as shown in FIG. 8.

As the input voltage Vi continues to drop toward 0 V, the switch S4 are turned on in every switching cycle again after Ton to allow the energy stored in Cres to be transferred to the magnetic core through winding L3 until the predetermined peak flux $\varphi_{pk}$ is reached. In this discharging process, the voltage across Cres continues to drop until it reaches its average value at the end of the half line cycle as shown in FIG. 8.

As shown in FIG. 8, during each switching cycle, the discharging of the magnetic flux through the secondary winding L2 to the load starts at the same predetermined peak flux $\varphi_{pk}$. Since the time period T of the switching cycle is constant within the half line cycle, the average power transferred to the output is consistent. Thus, the 120 Hz voltage ripple is not generated at the output of the flyback converter.

It should be noted that the predetermined peak flux $\varphi_{pk}$ level directly correlates to the output power. A close loop control scheme is required to regulate the output voltage through controlling the turn-on times of switches S3 and S4. The detailed description will be discussed with respect to FIG. 9. Furthermore, even though no 120 Hz voltage ripple is expected at the output of the flyback converter, the voltage across the energy storage capacitor Cres (Vres) exhibits a waveform resembling a 120 Hz sine wave as shown in FIG. 8. The Vres waveform is expected to start at its average value at the beginning of the half line cycle, and return to its average value when the half line cycle ends. As such, the peak and/or average value of the Vres signal can be used as an input signal of the PFC control loop, in order to determine the most appropriate Ton and T for each line cycle so as to simultaneously achieve power factor correction, output regulation and output ripple cancellation. Since within each switching cycle, the Ton and the period T are both constant, the time for the output to fully discharge the magnetic core through secondary winding L2 is also constant. The off time Toff (time period when all switches are off) and the time of either switch S3 or S4 to be turned on are complementary to each other. It is key for the PFC control loop to adjust T and Ton based on the input line voltage Vi and the Vres voltage such that a sufficient Toff is maintained. Once the sufficient Toff is maintained, the flyback PFC system always stays in the DCM. The detailed description of this PFC control loop will be discussed below with respect to FIG. 9.

Figure 9:
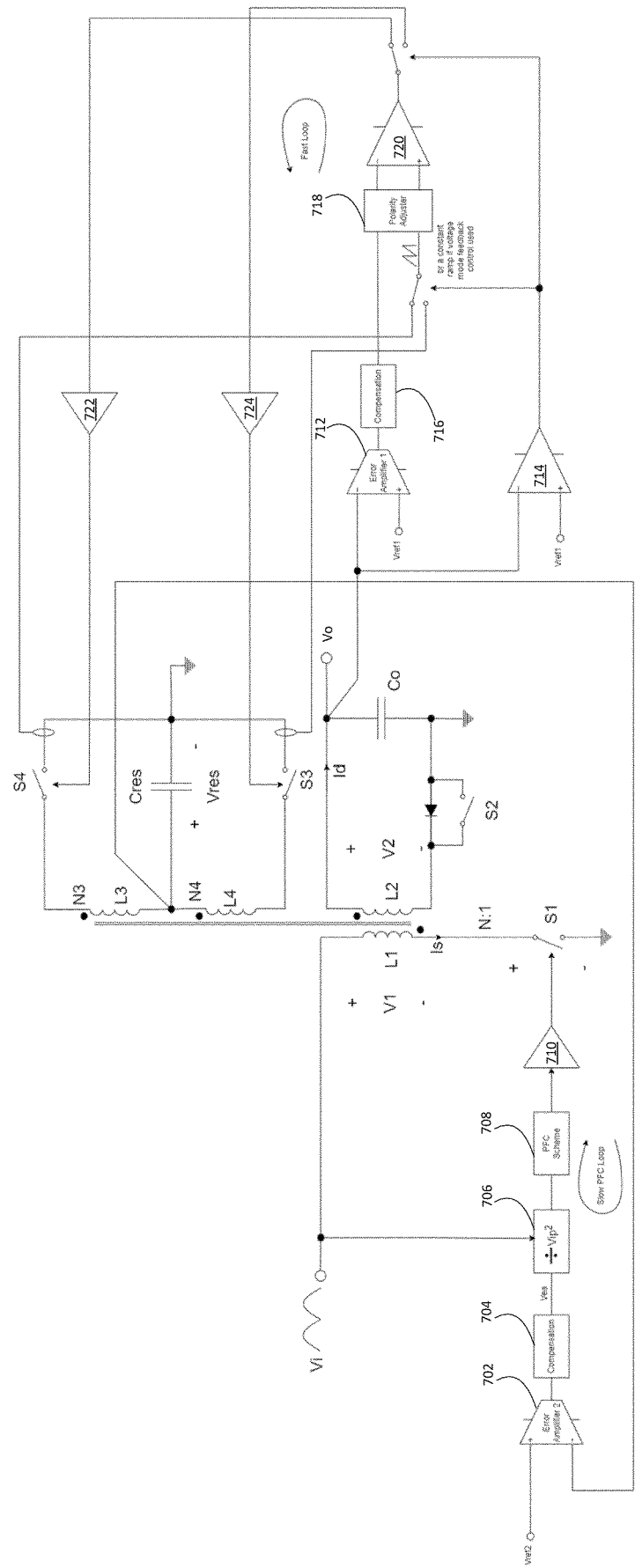
FIG. 9 illustrates a block diagram of two control loops for controlling the operation of the flyback PFC converter and the ripple cancellation apparatus shown in FIG. 5 in accordance with various embodiments of the present disclosure.

FIG. 9 illustrates a block diagram of two control loops for controlling the operation of the flyback PFC converter and the ripple cancellation apparatus shown in FIG. 5 in accordance with various embodiments of the present disclosure. A first control loop is used to control the operation of the ripple cancellation apparatus 104. A second control loop is used to control the power factor correction operation.

As shown in FIG. 9, the first control loop comprises a first error amplifier 712, a comparator 714, a first compensation network 716, a polarity adjuster block 718, a PWM comparator 720, a first driver 722 and a second driver 724. The second control loop comprises a second error amplifier 702, a second compensation network 704, a Vi feedforward block 706, a PFC control scheme block 708 and a third driver 710.

The first control loop is based on a current mode control scheme. As shown in FIG. 9, either the current flowing through S3 or the current flowing through S4 is used as a ramp signal fed into the PWM comparator 720. In operation, if the energy in the magnetic core is greater than the energy demanded by the load, S3 is turned on once S1 is turned off (at the end of Ton). The turn-on of S3 is triggered once the voltage at the common node of L4 and S3 goes negative. The output of the first error amplifier 712 is compensated by the first compensation network 716 and then fed into the inverting input of the PWM comparator 720. Once the ramp signal drops and reaches the compensated output voltage of the first error amplifier 712, S3 is turned off accordingly.

It should be noted that the current mode control scheme is merely an example. A person skilled in the art would understand there may be variations, modifications and alternatives. For example, the first control loop may be based on a voltage mode control scheme. Under the voltage mode control scheme, the current ramp signal will be replaced by a constant ramp signal.

In operation, if the energy in the magnetic core is less than the energy demanded by the load, S4 is turned on once S1 is turned off. The turn-on of S4 is triggered once the voltage at the common node of L3 and S4 goes positive. The output of the first error amplifier 712 is compensated by the first compensation network 716 and then fed into the non-inverting input of the PWM comparator 720. Once the ramp signal increases and reaches the compensated output voltage of the first error amplifier 712, S4 is turned off accordingly.

The polarity adjuster block 718 is used to swap the inputs of the PWM comparator 720 depending on which switch is being controlled. As discussed above, the turn-on of S3 ends when the ramp signal goes below the compensated output voltage of the first error amplifier 712. On the other hand, the turn-on of S4 ends when the ramp signal goes above the compensated output voltage of the first error amplifier 712. The polarity adjuster block 718 is used to swap the inputs of the PWM comparator 720 so that the PWM comparator 720 can be used to control both S3 and S4. For example, when the PWM comparator 720 is used to control S3, the ramp signal is connected to the non-inverting input of the PWM comparator 720, and the compensated output of the first error amplifier is connected to the inverting input of the PWM comparator 720. On the other hand, when the PWM comparator 720 is used to control S4, the ramp signal is connected to the inverting input of the PWM comparator 720, and the compensated output of the first error amplifier 712 is connected to the non-inverting input of the PWM comparator 720.

It should be noted that depending on different applications and design needs, the polarity adjuster block 718 may be omitted. Alternatively, the polarity adjuster block 718 could be digitally implemented.

The first control loop helps regulate the output voltage of the flyback converter 102 since the first error amplifier 712 is configured to sense the output voltage Vo as shown in FIG. 9. Vo is connected to the inverting input terminal of the error amplifier 712 while the non-inverting input terminal of the error amplifier 712 is connected to a predetermined voltage reference Vref1. The comparator 714 is used to determine which switch (S3 or S4) is being controlled by the first control signal. As shown in FIG. 9, the comparator 714 compares the output voltage of the flyback converter 102 with the predetermined reference Vref1. Based on this comparison, the comparator 714 switches the control to a corresponding switch depending on whether the output needs energy (e.g., the output voltage is below or going below the regulation or Vref1) or the output has extra energy (e.g., the output is above or going above the regulation or Vref1).

In operation, assuming at the beginning of a line cycle, the switch S4 is periodically turned on to supplement the magnetic flux in the magnetic core after Ton finishes in each switching cycle. If the output voltage Vo is less than the reference voltage Vref1, the comparator 714 is going to control the switches in the first control loop such that the current flowing through S4 is being sensed to produce the ramp signal feeding into the inverting input of the PWM comparator 720, and the compensated output of the first error amplifier 712 is connected to the inverting input of the PWM comparator 720. At the same time, the output of the comparator 720 is connected to the driver 722 to control the switching of switch S4.

During each switching cycle, after S4 is turned on, the current flowing through S4 continues to rise. Correspondingly, the ramp signal fed into the inverting input terminal of comparator 720 continues to rise until it is greater than the compensated output of the error amplifier 712. Once the ramp signal is greater than the compensated output of the error amplifier 712, the output of the comparator 720 flips to a logic low state, which turns off S4 through the driver 722. In this configuration, a lower Vo will yield a higher voltage feeding into the non-inverting input terminal of the comparator 720, which in turn allows S4 to be kept on for a longer time. A longer conduction time of S4 will cause the current flowing through S4 to ramp higher and lead to a higher peak magnetic flux $\varphi_{pk}$ in the magnetic core, which in turn raises the output voltage Vo, thereby completing the negative feedback control of the output voltage Vo of the flyback PFC converter.

Similarly, another negative feedback control loop is formed when switch S3 is controlled by the comparator 720. In particular, the turn on duration of switch S3 is shortened when the output voltage Vo is lower than the reference voltage Vref1. The compensation circuit 716 is used to introduce poles and zeros to the feedback loop to ensure the stability of the feedback loop.

The second control loop is similar to a traditional PFC control loop. The Vi feedforward block 706 is employed to improve the line regulation response. The power factor correction (PFC) control scheme block 708 is employed to control the on time of S1 such that the power factor is maintained and the input average current follows the input line voltage.

The difference between the traditional flyback PFC control loop and the second control loop is related to how the output voltage is detected. In the traditional PFC control loop, the output voltage is fed into the error amplifier. In contrast, in the second control loop, Vres is fed into the error amplifier. The reason of having this difference is that the output voltage of the flyback converter shown in FIG. 9 is regulated by the first control loop. The second control loop functions as a normal PFC control loop. Under the second control loop, the amount of average energy transferred to the primary is controlled through detecting the voltage at Vres. It is desirable to allow a large ripple on Vres so as to desensitize the loop. One way to achieve that is to make the second error amplifier 702 detect the average voltage at Vres. Another way to achieve that is to make the gain of the second error amplifier 702 non-linear and make it go high to modify the on time of S1 if Vres starts going beyond its ripple range in one direction. For example, if the average voltage at Vres starts moving up, then the ripple on Vres will start exceeding its range in the high limit. That means more energy is being transferred to the output than needed. The extra energy is absorbed by Cres. In order to reduce the extra energy, the turn-on time of S1 should be reduced. The reduced turn-on time will bring the average voltage at Vres back into the normal range.

Figure 10:
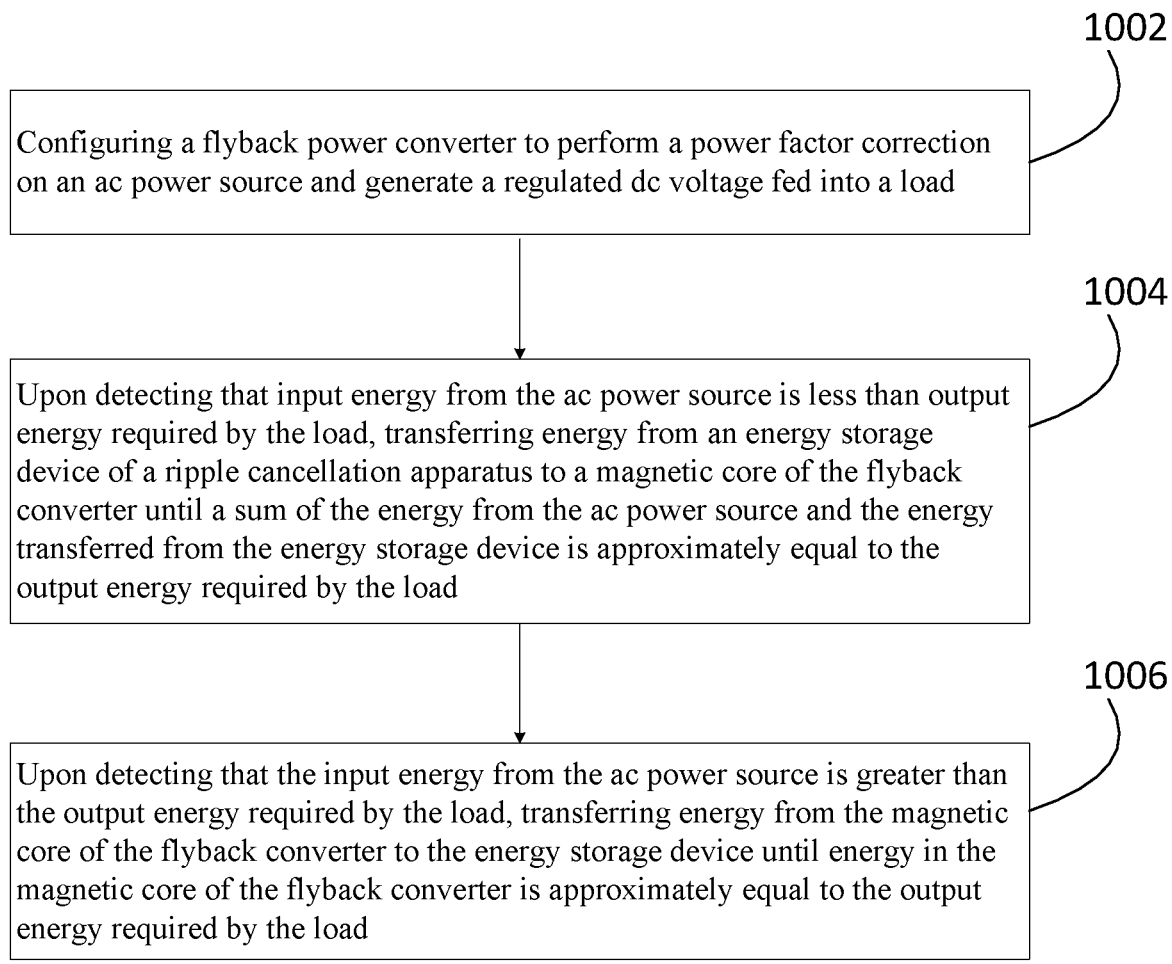
FIG. 10 illustrates a flow chart of a control method for the flyback converter shown in FIG. 5 in accordance with various embodiments of the present disclosure.

FIG. 10 illustrates a flow chart of a control method for the flyback converter shown in FIG. 5 in accordance with various embodiments of the present disclosure. This flowchart shown in FIG. 10 is merely an example, which should not unduly limit the scope of the claims. One of ordinary skill in the art would recognize many variations, alternatives, and modifications. For example, various steps illustrated in FIG. 10 may be added, removed, replaced, rearranged and repeated.

Referring back to FIG. 5, a flyback converter is configured to perform a power factor correction on an ac power source and generate a regulated dc voltage fed into a load. A ripple cancellation apparatus comprises a plurality of windings (e.g., L3 and L4) magnetically coupled to windings (e.g., L1 and L2) of the flyback converter through a magnetic core of the flyback converter. The ripple cancellation apparatus further comprises an energy storage device coupled to the plurality of windings through respective switches. In operation, the ripple cancellation apparatus is configured such that output ripples of the flyback converter cancel each other.

At step 1002, a flyback power converter is configured to perform a power factor correction on an ac power source and generate a regulated dc voltage fed into a load.

At step 1004, upon detecting that input energy from the ac power source is less than output energy required by the load, energy is transferred from an energy storage device of a ripple cancellation apparatus to a magnetic core of the flyback power converter until a sum of the energy from the ac power source and the energy transferred from the energy storage device is approximately equal to the output energy required by the load.

At step 1006, upon detecting that the input energy from the ac power source is greater than the output energy required by the load, energy is transferred from the magnetic core of the flyback power converter to the energy storage device until energy in the magnetic core of the flyback power converter is approximately equal to the output energy required by the load.

The flyback power converter comprises a first winding and a first switch connected in series between an input terminal of the flyback power converter and ground, and a second winding magnetically coupled to the first winding, the second winding coupled to an output terminal of the flyback power converter through a second switch.

The ripple cancellation apparatus comprises a third winding magnetically coupled to the first winding and connected in series with a fourth switch, a fourth winding magnetically coupled to the first winding and connected in series with a third switch, and the energy storage device connected between a common node of the third winding and the fourth winding, and ground.

The method further comprises upon detecting that the input energy from the ac power source is less than the output energy required by the load, configuring the fourth switch to be turned on until the energy in the magnetic core of the flyback power converter is approximately equal to the output energy required by the load.

The method further comprises upon detecting that the input energy from the ac power source is greater than the output energy required by the load, configuring the third switch to be turned on until the energy in the magnetic core of the flyback power converter is approximately equal to the output energy required by the load.

The method further comprises configuring the ripple cancellation apparatus to eliminate output ripples of the flyback power converter through a first control loop, and configuring the flyback power converter to perform the power factor correction through a second control loop.

The second control loop comprises a second error amplifier having a non-inverting input configured to receive a second predetermined reference, and an inverting input connected to a common node of the third winding and the fourth winding.

The first control loop is faster than the second control loop. The first control loop comprises a first error amplifier having an inverting input configured to receive the regulated dc voltage, and a non-inverting input configured to receive a first predetermined reference, and wherein the first control loop is configured such that a negative feedback control scheme is applied to the regulated dc voltage through adjusting a turn on duration of the fourth switch or a turn on duration of the third switch.

Although embodiments of the present disclosure and its advantages have been described in detail, it should be understood that various changes, substitutions and alterations can be made herein without departing from the spirit and scope of the disclosure as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. An apparatus comprising:
    a first winding and a first switch connected in series between an input terminal and ground;
    a second winding magnetically coupled to the first winding and coupled to an output terminal through a rectifier device;
    a third winding magnetically coupled to the first winding and connected in series with a fourth switch;
    a fourth winding magnetically coupled to the first winding and connected in series with a third switch; and an energy storage device connected between a common node of the third winding and the fourth winding, and a common node of the third switch and the fourth switch.

2. The apparatus of claim 1, wherein:
the energy storage device is a capacitor; and
the rectifier device is a second switch.

3. The apparatus of claim 2, wherein:
the first winding, the first switch, the second winding, the second switch and an output capacitor form a flyback converter.

4. The apparatus of claim 3, wherein:
the flyback converter is configured to receive an ac voltage and convert the ac voltage into a regulated dc voltage.

5. The apparatus of claim 3, wherein:
a first terminal of the first winding is connected to the input terminal;
a second terminal of the first winding is connected to the first switch;
a first terminal of the second winding is connected to the output terminal;
a second terminal of the second winding is connected to the second switch;
a first terminal of the third winding is connected to the fourth switch;
a second terminal of the third winding is connected to the energy storage device;
a first terminal of the fourth winding is connected to the energy storage device; and
a second terminal of the fourth winding is connected to the third switch, and wherein the second terminal of the first winding, the first terminal of the second winding, the first terminal of the third winding and the first terminal of the fourth winding share a same polarity.

6. The apparatus of claim 5, wherein:
the first winding, the second winding, the third winding and the fourth winding are magnetically coupled to each other through a magnetic core of the flyback converter.

7. The apparatus of claim 6, wherein:
upon detecting that input energy of the flyback converter is less than output energy demanded by a load coupled to the flyback converter, the fourth switch is turned on once the first switch is turned off, and the fourth switch remains on until energy stored in the magnetic core of the flyback converter is increased to a first predetermined level.

8. The apparatus of claim 6, wherein:
upon detecting that input energy of the flyback converter is greater than output energy demanded by a load coupled to the flyback converter, the third switch is turned on once the first switch is turned off, and the third switch remains on until energy stored in the magnetic core of the flyback converter is reduced to a second predetermined level.

9. The apparatus of claim 1, wherein:
the rectifier device is a second switch; and
the first switch, the third switch and the fourth switch are isolation switches.

10. A method comprising:
configuring a flyback power converter to perform a power factor correction on an ac power source and generate a regulated dc voltage fed into a load;
upon detecting that input energy from the ac power source is less than output energy required by the load, transferring energy from an energy storage device of a ripple cancellation apparatus to a magnetic core of the flyback power converter until a sum of the energy from the ac power source and the energy transferred from the energy storage device is approximately equal to the output energy required by the load; and
upon detecting that the input energy from the ac power source is greater than the output energy required by the load, transferring energy from the magnetic core of the flyback power converter to the energy storage device until energy in the magnetic core of the flyback power converter is approximately equal to the output energy required by the load.

11. The method of claim 10, wherein:
the flyback power converter comprising:
a first winding and a first switch connected in series between an input terminal of the flyback power converter and ground; and
a second winding magnetically coupled to the first winding, the second winding coupled to an output terminal of the flyback power converter through a second switch; and
the ripple cancellation apparatus comprising:
a third winding magnetically coupled to the first winding and connected in series with a fourth switch;
a fourth winding magnetically coupled to the first winding and connected in series with a third switch; and
the energy storage device connected between a common node of the third winding and the fourth winding, and ground.

12. The method of claim 11, further comprising:
upon detecting that the input energy from the ac power source is less than the output energy required by the load, configuring the fourth switch to be turned on until the energy in the magnetic core of the flyback power converter is approximately equal to the output energy required by the load; and
upon detecting that the input energy from the ac power source is greater than the output energy required by the load, configuring the third switch to be turned on until the energy in the magnetic core of the flyback power converter is approximately equal to the output energy required by the load.

13. The method of claim 11, further comprising:
configuring the ripple cancellation apparatus to eliminate output ripples of the flyback power converter through a first control loop; and
configuring the flyback power converter to perform the power factor correction through a second control loop.

14. The method of claim 13, wherein:
the second control loop comprises a second error amplifier having a non-inverting input configured to receive a second predetermined reference, and an inverting input connected to a common node of the third winding and the fourth winding.

15. The method of claim 13, wherein:
the first control loop is faster than the second control loop, and wherein the first control loop comprises a first error amplifier having an inverting input configured to receive the regulated dc voltage, and a non-inverting input configured to receive a first predetermined reference, and wherein the first control loop is configured such that a negative feedback control scheme is applied to the regulated dc voltage through adjusting a turn on duration of the fourth switch or a turn on duration of the third switch.

16. A system comprising:
a flyback converter configured to perform a power factor correction on an ac power source and generate a regulated dc voltage fed into a load; and
a ripple cancellation apparatus comprising:
   a plurality of windings magnetically coupled to windings of the flyback converter through a magnetic core of the flyback converter; and
   an energy storage device coupled to the plurality of windings through respective switches, wherein the ripple cancellation apparatus is configured such that output ripples of the flyback converter cancel each other.

17. The system of claim 16, wherein the flyback converter comprises:
a first winding and a first switch connected in series between an input terminal and ground;
a second winding magnetically coupled to the first winding and coupled to an output terminal through a second switch; and
an output capacitor connected between the output terminal and a secondary ground.

18. The system of claim 17, wherein the ripple cancellation apparatus comprises:
a third winding magnetically coupled to the first winding and connected in series with a fourth switch;
a fourth winding magnetically coupled to the first winding and connected in series with a third switch; and
the energy storage device connected between a common node of the third winding and the fourth winding, and ground.

19. The system of claim 18, wherein:
the energy storage device is a capacitor; and
the third switch and the fourth switch are isolation switches.

20. The system of claim 18, wherein:
upon detecting that input energy of the flyback converter is less than output energy demanded by the load, the fourth switch is turned on once the first switch is turned off, and the fourth switch remains on until energy stored in the magnetic core of the flyback converter is increased to a first predetermined level; and
upon detecting that the input energy of the flyback converter is greater than the output energy demanded by the load, the third switch is turned on once the first switch is turned off, and the third switch remains on until the energy stored in the magnetic core is reduced to a second predetermined level.

* * * * *